Patented Oct. 8, 1946

2,409,137

UNITED STATES PATENT OFFICE 2,409,137

PROCESS OF SEPARATING TALL OIL INTO FRACTIONS BY TREATMENT WITH LEVULINIC ACID ESTER

Kermit D. Longley, Philadelphia, Pa., assignor to Quaker Chemical Products Corp., Conshohocken, Pa., a corporation of Pennsylvania No Drawing. Application December 26, 1944, Serial No. 569,907

2 Claims. (Cl. 260—97.5)

This invention relates to treatment of tall oil and more particularly relates to the separation of tall oil into its components.

Tall oil is obtained in large quantities in the paper industry from the manufacture of paper pulp by the sulfate process. It comprises a mixture of components including large percentages of fatty acids and rosin acids, together with some non-acid constituents which include considerable amounts of sterols.

Tall oil has been separated into its constituents by extraction with selective solvents and also by selective solution and crystallization. As selective solvents for the rosin acids there has been used aqueous solutions of monomethyl ether of ethylene glycol, furfural, diacetone alcohol, and the like. Such materials have not been entirely satisfactory for an extraction process or for a crystallization process. In the crystallization process using these materials the rosin acids are crystallized from the solution but no separation of the sterols and fatty acids are made from each other, and if it is desired to separate these an extra step involving a saponification and water extraction must be used.

An object of the invention is to provide an efficient and economic process for separating the fatty acids from the rosin acids and other constituents of tall oil.

A further object is to provide a simple crystallization process for obtaining in separate fractions compositions composed mainly of fatty acids, of rosin acids, and of sterols.

Other objects and advantages of the invention will become apparent as the following detailed description progresses.

I have discovered that when tall oil is mixed with a levulinic acid ester an apparently homogeneous solution is first obtained, and then after a few minutes at room temperature a wax solid separates which has a very low acid number and consists largely of sterols. After separation of the sterols from the liquid and on cooling the liquid to, for example, minus 30° F., pale yellow crystals separated from the liquid. This crystalline material is predominantly fatty acids and the remaining liquid consists mostly of rosin acids. It is thus seen that I have provided a simple method of separating compositions composed predominantly of sterols, of fatty acids and rosin acids each from the other.

In carrying out this crystallization procedure, the ratio of tall oil to levulinic acid ester may be varied widely. Generally I use more ester than tall oil but I have also obtained satisfactory results when the tall oil is present in excess.

The levulinic acid esters which I prefer to use are methyl levulinate and ethyl levulinate preferably containing a minor amount of levulinic acid.

In accordance with another embodiment of my invention, a levulinic acid ester preferably containing a minor proportion of free levulinic acid is agitated with a solution of tall oil in a hydrocarbon solvent such as naphtha. The rosin acids are more soluble in the ester of levulinic acid than in the hydrocarbon solvent, while the sterols and the fatty acids are more soluble in the hydrocarbon solvent. The ester of levulinic acid is immiscible with the hydrocarbon solvent so that the ester layer containing the rosin acids may be readily separated when desired from the hydrocarbon layer containing the fatty acids and sterols. The fatty acids and sterols may be recovered from the hydrocarbon by known means such as by distillation or extraction. The rosin acids may be recovered by concentrating and chilling the solution to bring about crystallization.

It will be apparent that instead of using a simple batch extraction a counter current extraction may be used.

The following examples are given to illustrate the invention:

*Example I*

100 grams of methyl levulinate containing 8% free levulinic acid were shaken with 73 grams of naphtha containing 25 grams of refined tall oil with a rosin acid content of 42%. The product obtained from the naphtha layer had a rosin acid content of 26% and the fraction obtained from the methyl levulinate layer had a rosin content of 53.4%.

*Example II*

116 grams of distilled tall oil were mixed with 460 grams of methyl levulinate. At room temperature six grams of a white waxy solid separated which had a very low acid number and consists largely of sterols. At −30° F. 54 grams of a bland light colored oil containing 17% rosin acids and the remainder predominantly fatty acids separated as a pale yellow crystalline mass.

A suitable temperature range for crystallizing out fatty acids is any temperature substantially below room temperature such as below 50° F., preferably from 30° F. to −30° F.

Instead of using the anhydrous ester of levulinic acid in my processes, I may use an aqueous solution of the ester. However, when the ester is used in the extraction process it is preferable to use an ester containing not more than about 6% by weight of water in order to prevent the formation of a third layer consisting substantially of water when extracting with naphtha.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. The process of separating tall oil into useful fractions which comprises mixing tall oil with a liquid ester of levulinic acid to form an apparently homogeneous solution, allowing the solution to stand at approximately normal room temperature until a waxy solid precipitates, separating the precipitate from the supernatant and cooling the supernatant to substantially below room temperature whereby a fraction consisting largely of fatty acids precipitates.

2. The process of separating tall oil into useful fractions which comprise mixing tall oil with methyl levulinate to form an apparently homogeneous solution, allowing the solution to stand at approximately normal room temperature until a waxy solid precipitates, separating the precipitate from the supernatant and cooling the supernatant to substantially below room temperature whereby a fraction consisting largely of fatty acids precipitates.

KERMIT D. LONGLEY.